(12) United States Patent
Yamada et al.

(10) Patent No.: US 7,708,867 B2
(45) Date of Patent: May 4, 2010

(54) GAS DIFFUSION ELECTRODE

(75) Inventors: Yuji Yamada, Fujisawa (JP); Takeshi Kasuga, Fujisawa (JP); Yoshinori Nishiki, Fujisawa (JP); Tsuneto Furuta, Fujisawa (JP)

(73) Assignee: Permelec Electrode Ltd., Kanagawa (JP)

( * ) Notice: Subject to any disclaimer, the term of this patent is extended or adjusted under 35 U.S.C. 154(b) by 251 days.

(21) Appl. No.: 11/349,126

(22) Filed: Feb. 8, 2006

(65) Prior Publication Data

US 2006/0175195 A1   Aug. 10, 2006

(30) Foreign Application Priority Data

Feb. 8, 2005  (JP)  ............ P.2005-031774

(51) Int. Cl.
*C25B 11/04* (2006.01)
*C25B 11/06* (2006.01)
*C25B 11/08* (2006.01)
*C25B 11/12* (2006.01)
*H01M 4/86* (2006.01)
*H01M 4/90* (2006.01)
*H01M 4/92* (2006.01)
*H01M 4/96* (2006.01)

(52) U.S. Cl. .............. 204/283; 204/282; 204/284; 429/40; 429/42; 429/44; 429/45

(58) Field of Classification Search ............ 204/252, 204/263, 265, 266, 282, 283, 284; 429/40, 429/42, 44, 45

See application file for complete search history.

(56) References Cited

U.S. PATENT DOCUMENTS

| | | | |
|---|---|---|---|
| 5,536,379 A | | 7/1996 | Nonaka et al. |
| 6,010,606 A | * | 1/2000 | Denton et al. ............ 204/284 |
| 6,117,286 A | * | 9/2000 | Shimamune et al. ....... 204/252 |
| 7,083,708 B2 | * | 8/2006 | Chlistunoff et al. ........ 204/252 |
| 7,220,508 B2 | * | 5/2007 | Watakabe et al. ............ 429/33 |
| 2002/0189936 A1 | | 12/2002 | Shimamune |
| 2005/0214607 A1 | * | 9/2005 | Imahashi et al. ............ 429/23 |

FOREIGN PATENT DOCUMENTS

| | | |
|---|---|---|
| CN | 1275175 A | 11/2000 |
| JP | 56-096458 A | 8/1981 |
| JP | 8-283979 A | 10/1996 |
| JP | 2000-299113 A | 10/2000 |
| JP | 3553775 B2 | 5/2004 |
| WO | 03/042430 A2 | 5/2003 |

OTHER PUBLICATIONS

Extended European Search Report dated Oct. 28, 2008.
Chinese Patent Office Action dated May 8, 2009.
"Domestic and Foreign Situations Regarding Oxygen Cathode for Sodium Chloride Electrolysis"(Sodium Chlorine, vol. 45, p. 85-108, 1994.
Japanese Office Action dated Jun. 30, 2009.

\* cited by examiner

*Primary Examiner*—Bruce F Bell
(74) *Attorney, Agent, or Firm*—Sughrue Mion, PLLC

(57) ABSTRACT

The present invention provides a gas diffusion electrode having: an electrode substrate; and a catalyst layer containing a hydrophilic catalyst and a hydrophobic binder, which is carried on the electrode substrate, wherein the electrode substrate contains at least one carbon material selected from a carbon cloth, a carbon paper, a foamed carbon material, and a sintered carbon material.

2 Claims, 3 Drawing Sheets

—○— NUMBER OF DAYS OF ELECTROLYSIS : 9 DAYS
—■— NUMBER OF DAYS OF ELECTROLYSIS : 150 DAYS

GAS DIFFUSION ELECTRODE

FIELD OF THE INVENTION

The present invention relates to a gas diffusion electrode for use in sodium chloride electrolysis industry, etc.

BACKGROUND OF THE INVENTION

A gas diffusion electrode has a feature in that a gas as a reaction substance is supplied to a surface of an electrode to proceed oxidation or reduction of the gas on the electrode, and it has been developed so far mainly for the application use of fuel cells, etc., and it has been started for the study on the use of the gas diffusion electrode for industrial electrolysis in recent years. For example, a hydrophobic cathode for conducting oxygen reduction reaction is utilized for an electrolytic production apparatus of hydrogen peroxide. Further, in alkali production and winning processes, hydrogen oxidation reaction is conducted as a substitute for the oxygen generation at the anode (hydrogen anode) or oxygen reducing reaction is conducted as a substitute for hydrogen generation at the cathode (oxygen cathode) by using a gas diffusion electrode intending to decrease the electric power consumption. It has been reported that depolarization is possible by collecting metals such as zinc, or substituting the oxygen generation at the anode as the counter electrode in zinc plating with hydrogen anode.

However, since the composition of the solution and the gas is not simple or the operation conditions are severe in the industrial electrolysis described above compared with the case of fuel cells, it gives rise to a problem that a sufficient electrode life and a sufficient performance can not be obtained.

Sodium hydroxide (caustic soda) and chlorine which are important as industrial materials are mainly produced by the sodium chloride electrolytic method. The electrolytic process has been changed through a mercury method of using a mercury cathode and a diaphragm method of using an asbestos diaphragm and a soft iron cathode to an ion-exchange membrane method of using an ion-exchange membrane for a diaphragm and using an activated cathode with a low overvoltage as the cathode. Meanwhile, the unit power consumption required for the production of sodium hydroxide has been decreased down to 2000 kwh per one ton. However, since the production of sodium hydroxide steel requires a great amount of power consumption, a further reduction for the unit power consumption has been desired.

The anode and cathode reactions in the existent electrolytic method are as follows, respectively:

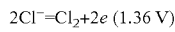

$2Cl^-=Cl_2+2e$ (1.36 V)

$2H_2O+2e=2OH^-+H_2$ (−0.83 V)

in which the theoretical decomposition voltage is 2.19 V.

In a case of using an oxygen cathode instead of taking place hydrogen generation reaction at the cathode, it is expressed as follows:

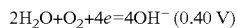

$2H_2O+O_2+4e=4OH^-$ (0.40 V)

in which power consumption can be decreased by 1.23 V theoretically and by about 0.8 V also in a practical range of current density and saving of unit power consumption by 700 kwh per 1 ton of sodium hydroxide can be expected. Accordingly, while the practical use of sodium chloride electrolytic process by utilizing a gas diffusion electrode has been studied since 1980 years, it is indispensable for the development of an oxygen cathode at a high performance and having a sufficient stability in the electrolytic system in order to attain the process.

The domestic or foreign situation regarding the oxygen cathode in sodium chloride electrolysis is detailed in "Domestic and Foreign Situations Regarding Oxygen Cathode for Sodium Chloride Electrolysis" (Sodium and Chlorine, vol. 45, p. 85-108 (1994)).

FIG. 1 shows a schematic view of a sodium chloride electrolytic cell 1 using an oxygen gas diffusion cathode which is practiced most generally at present.

An oxygen gas diffusion cathode 5 is disposed on the side of the cathode of a cation-exchange film 2 through a cathode solution chamber 6, and oxygen as a raw material is supplied from a gas chamber 7 at the back of the cathode. The oxygen diffuses in the cathode 5 and reacts with water in a catalyst layer to form sodium hydroxide. Accordingly, the cathode 5 used in the electrolytic method need to be a so-called gas-liquid separation type gas diffusion electrode that allows only the oxygen to permeate therethrough sufficiently and inhibiting the sodium hydroxide from leaking to the gas chamber. Oxygen gas diffusion cathodes proposed at present for use in sodium chloride electrolysis to satisfy such a requirement mainly include those of gas diffusion electrodes supporting a catalyst such as silver, platinum, etc. on an electrode substrate formed by mixing a carbon powder and PTFE and molding them into a sheet.

However, this type of the electrode described above involves several significant subjects. That is, (1) Carbon used as an electrode material is easily deteriorated under the co-existence of sodium hydroxide and oxygen at high temperature to remarkably lower the electrode performance.

(2) It is difficult to prevent leakage of a sodium hydroxide solution generated along with increase of the liquid pressure and degradation of the electrode to the side of the gas chamber so long as the existent electrode is used.

(3) It is difficult to manufacture electrodes of a size necessary for a practical level (1 m² or more) uniformly.

(4) While the pressure in the cathode solution chamber opposed to the gas chamber through the gas diffusion electrode changes depending on the height, it is difficult to provide a corresponding pressure distribution of the oxygen gas supplied.

(5) There is a solution resistance loss of the cathode solution, and it requires a power for the stirring thereof.

(6) Upon practical application, a remarkable improvement is necessary for existent electrolytic equipments.

The problem (1) can be coped with by the formation of a protective layer with silver catalyst powder or silver plating. On the other hand, a novel electrolytic method for solving the problems (2) to (6) has been proposed (refer to FIG. 2). An electrolytic cell 8 has a feature in that an oxygen gas diffusion cathode 9 is disposed in close contact with an ion-exchange membrane 10 (zero-gap structure), oxygen and water as the raw materials are supplied from the back of the electrode, and sodium hydroxide as a product is collected at the back or below the electrode. Since this is structured with two chambers comprising a cathode chamber served both as a cathode gas chamber and a cathode solution chamber, and an anode chamber, it is referred to as a 2-chamber method.

In a case of using the electrolytic method, the problem (2) can be solved, and separation between the cathode chamber (caustic chamber) and also the gas chamber is not necessary. Further, since the electrode is in close contact with the ion-exchange membrane in the structure, existent facilities of the ion-exchange membrane method can be used as they are, which can solve the problems (5) and (6).

The performance required for the oxygen gas diffusion cathode suitable to this electrolytic process is greatly different from that in the existent type and it is necessary to ensure a sufficient gas permeability, a sufficient hydrophobic property for avoiding flooding due to the solution of sodium hydroxide and a hydrophilic property for easily allowing the solution of sodium hydroxide to permeate in the electrode at the same time.

On the other hand, for collecting the solution of sodium hydroxide leaked to the back of the electrode, it is no more necessary that the electrode has a function of separating the cathode solution chamber and the cathode gas chamber. Accordingly, it is not necessary that the electrode is in an integrated structure and the size can also be increased also relatively easily to dissolve the problem (3).

Naturally, since it undergoes no effect of the change of the liquid pressure along the direction of the height, the problem (4) can not occur.

As such an electrode, JP 8-283979 A proposes a 2-chamber type gas diffusion electrode using a foamed or meshed nickel body as a substrate. Also in a case of using the gas diffusion electrode, since the formed sodium hydroxide moves not only to the back but also moves gravitationally in the direction of the height, sodium hydroxide stagnates inside the electrode in a case where sodium hydroxide is formed excessively to result in a problem of inhibiting the gas supply.

For solving the problem, Japanese Patent No. 3553775 proposes a method of disposing a hydrophilic layer between the ion-exchange membrane and the electrode.

As described above, while the gas diffusion electrode has been improved so as to be suitable to the industrial electrolytic system, in a case of operation at a high current density, even such an improved electrolytic cell structure for the 2-chamber method does not tend to obtain a sufficient primary electrolytic performance. It is supposed that since supply of the oxygen gas as the raw material to the electrode catalyst constitutes a rate-determining factor to hinder the reducing reaction of oxygen at the electrode.

SUMMARY OF THE INVENTION

An object of the present invention is to overcome the problems in the 2-chamber method electrolysis described above and provide a high performance oxygen gas diffusion electrode that can be used also to a large-scale electrolytic cell and operated at a high current density.

The present invention provides a gas diffusion electrode comprising: an electrode substrate; and a catalyst layer containing a hydrophilic catalyst and a hydrophobic binder, which is carried on the electrode substrate, wherein the electrode substrate contains at least one carbon material selected from a carbon cloth, a carbon paper, a foamed carbon material, and a sintered carbon material.

Figure 1:
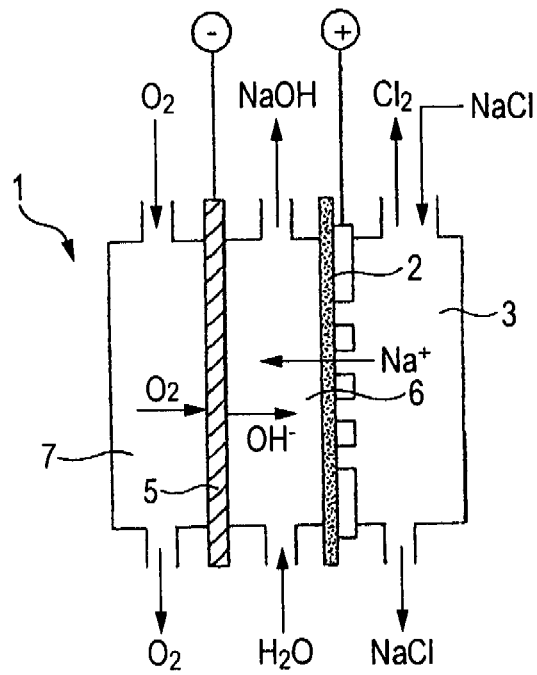
FIG. 1 is a schematic view showing an example of a sodium chloride electrolytic cell using an oxygen gas diffusion cathode.

The reference numerals used in the drawings denote the followings, respectively.

11: sodium chloride electrolytic cell
12: cation-exchange membrane
15: insoluble anode
16: hydrophilic layer
17: oxygen gas diffusion cathode

DETAILED DESCRIPTION OF THE INVENTION

The invention is to be described specifically.

The invention uses carbon cloth, carbon paper, foamed carbon material and/or sintered carbon material as an electrode substrate for an oxygen gas diffusion electrode, which is different from a substrate formed by mixing a carbon powder and a fluororesin as usual.

The thus constituted oxygen gas diffusion electrode may be applied with pressing fabrication subsequently at a pressure of 1 to 50 kgf/cm$^2$.

Further, a conductive metal may also be incorporated to a portion of the electrode substrate and the content thereof is preferably from 1 to 50% by volume. Specifically, the electrode substrate may be covered with the conductive metal, or a fiber or a particle of the conductive material may be mixed in the electrode substrate.

The reasons of improving the electrode performance in the invention can be considered that this is due to the improvement of the performance of supplying the oxygen gas as the raw material to the electrode catalyst compared with an existent 2-chamber type gas diffusion electrode using a foamed or meshed nickel body as a substrate.

It is considered that the pressing fabrication further improves the performance of supplying the oxygen gas as the raw material, as well as contributes to the decrease of the electrode resistance due to compression.

Further, in a case of covering the electrode substrate with the conductive metal or a case of mixing particles, fibers, etc. of the conductive metal in the electrode substrate, it is considered that not only the conductivity of the electrode substrate increases but also removal of the formed solution of sodium hydroxide by hydrophilic property of the conductive metal is promoted and, further, the carbon material is protected.

At least one carbon material selected from carbon cloth, carbon paper, foamed carbon material and sintered carbon material is used for the electrode substrate for the oxygen gas diffusion electrode of the invention. The electrode substrates described above are usually porous, and appropriate porosity is preferred for the supply or removal of gas or liquid. Further, it is preferred that the electrode substrate can maintain a sufficient conductivity. It is preferred that the thickness of the electrode substrate is from 0.05 to 5 mm, the porosity is from 30 to 95% and a typical pore diameter is from 0.001 to 1 mm.

The carbon cloth is a material formed by bundling a several hundreds of fine carbon fibers having a diameter of several μm and fabricating them into a woven fabric, which is a material excellent in the gas liquid permeability.

The carbon paper is a material formed by forming starting carbon fibers into a thin film precursor by a paper making process and sintering the same, which is suitable as a substrate material.

Further, a sintered carbon material that is formed by sintering a carbon powder and/or a foamed carbon material molded by using a porous foamed urethane resin material are also preferred materials as the electrode substrate.

The electrode substrate material preferably has a high conductivity. Although the carbon material described above is conductive, it is inferior to metals and, even in graphite, it is difficult to be 1 mΩcm or lower. Further, since the carbon material is soft and flexible, the conductivity in the direction of the thickness changes depending on the pressure applied, and usually the gas diffusion electrode is used while applying pressure in the direction of the thickness. Although the soft and flexibility is a preferred property for the electrode substrate material, change of the conductivity in the direction of the thickness is not preferred. The pressing fabrication can be applied with an aim of improving the change of the conductivity.

The pressing fabrication improves the conductivity by compressing the carbon material, as well as minimizes the change of the conductivity to stabilize the same in the use under a pressure.

As the press fabrication apparatus, general apparatus such as hot press and hot roller can be used. The pressing conditions are preferably at a temperature of from room temperature to 360° C. and at a pressure of from 1 to 50 kgf/cm$^2$. Below 1 kgf/cm$^2$, the effect of pressing is less obtainable, and, in excess of 50 kgf/cm$^2$, the structure of the gas diffusion electrode is compressed excessively to sometimes become fragile.

In the present invention, the press fabrication may also be conducted to a gas diffusion electrode that is produced by forming a catalyst layer on the electrode substrate, which is described in detail as follows, as well as the electrode substrate as described above.

In a case where improvement or the stabilization of the conductivity with the pressing fabrication is insufficient or in a case where further improvement for the conductivity and stabilization is desirable, this can be attained by incorporating a conductive metal to a portion of the electrode substrate, preferably by covering the electrode substrate with a conductive metal, or mixing a fiber or a particle of the conductive material into the electrode substrate. Since the conductive metal is incorporated, additional current supply channels are formed and, as a result, lowering of the voltage due to the resistance can be decreased. As the conductive metal, any metal can be used so long as it is a stable metal, silver or an alloy thereof is preferred in view of the cost, the resistance value and the stability. For the formation of the conductive metal to the surface or the inside of the electrode substrate, general techniques such as chemical plating, electric plating, vapor deposition, and thermal decomposition can be utilized and it is also possible by mixing or weaving metal particles or fibers.

The coating or the mixing amount of the conductive metal is preferably in such an amount corresponding to $\frac{1}{100}$ to $\frac{1}{2}$ of the solid volume of the electrode substrate. While the conductive metal is preferably formed continuously in the direction of the thickness, the effect can be obtained also by partial formation. In the case of silver, the coating or mixing amount per projection area is preferably from 5 to 500 g/m$^2$, and in excess of the range, the gas supplying performance is lowered and it is not economical as well.

Then, a catalyst layer is formed on the electrode substrate. As the catalyst, a hydrophilic catalyst is preferably used, and more preferably, a metal such as platinum, palladium, ruthenium, iridium, copper, silver, cobalt or lead, or an oxide thereof and, particularly, silver or an alloy thereof is preferred in view of the cost and the electrolytic performance. The catalyst metal or catalyst oxide functions as a catalyst for the oxygen cathode reaction and also forms a permeation path in the electrode for the formed solution of sodium hydroxide by the hydrophilic property thereof.

The surface of the electrode substrate material is generally hydrophobic, and although it is a preferred material in view of the oxygen gas supply, it is not a preferred material in view of the collection of the formed sodium hydroxide. Further, since the degree of the hydrophobic property of the electrode substrate material changes along with operation, for ensuring the hydrophobic property to maintain the sufficient gas supplying performance for a long time, a hydrophobic binder has been utilized for forming the catalyst layer so far.

Also in this invention, a hydrophobic binder is incorporated in the catalyst layer. For example, the powder of the catalyst is mixed with a binder such as a fluoro-ingredient having the hydrophobic property and a solvent such as water or naphtha to prepare a paste, which is coated and secured to the electrode substrate. The grain size of the powder of the fluoro-ingredient is, preferably, from 0.005 to 10 µm and a specific fluoro-ingredient includes, for example, fluorinated pitch, fluorinated graphite, and fluoro-resin. Particularly, it is a preferred method for obtaining a uniform and favorable performance to bake a durable fluoro-resin at a temperature from 200° C. to 400° C. and using the same. Coating, drying and baking are preferably practiced each for several times separately since this can provide a homogeneous catalyst layer. The hydrophobic binder provides a sufficient gas permeability and prevents flooding of the catalyst layer by the solution of sodium hydroxide.

By the procedures described above, it is possible to manufacture a gas diffusion electrode having a sufficient gas permeability, a sufficient hydrophobic property for avoiding flooding due to sodium hydroxide and a hydrophilic property for allowing the solution of sodium hydroxide to permeate easily in the electrode, as well as having high conductivity.

As described above, in a case of applying the 2-chamber type gas diffusion electrode to a sodium chloride electrolytic cell at a high current density and of a large size, when a hydrophilic layer is disposed between the ion-exchange membrane and the electrode, this provides an effect of maintaining the electrolyte and removing the same from the reaction site. For the hydrophilic layer, a porous structure comprising a corrosion resistant metal or resin is preferred. Since this is a part not contributing to the electrode reaction, it may not have conductivity. As an example, carbon, ceramics such as zirconium oxide and silicon carbides, resins such as PTFE and FEP rendered hydrophilic, and metals such as nickel, stainless steel or silver are preferred. Silver is particularly preferred as the metal. A sheet at a thickness of from 0.01 to 5 mm is preferred.

Since the hydrophilic layer is disposed between the ion-exchange membrane and the cathode, a material which is elastic and deforms in a case where not uniform pressure distribution is caused and absorbs the same is preferred. Further, such material and structure as capable of always maintaining the cathode solution are preferred and the hydrophilic material is formed on the surface as required. A preferred structure includes sintered plates or laminates thereof formed by molding them into a sheet shape using nets, woven fabrics, non-woven fabrics, foamed materials and powders as the starting material and using a hole forming agent and various binders and then removing the hole forming particles by a solvent. A typical hole size is from 0.005 to 5 mm.

In a case of disposing the gas diffusion electrode to the electrolytic cell, a conductive support material can be used with an aim of supporting the electrode and assisting electric conduction. The support material preferably has an appropriate uniformness and cushioning property. Known materials such as metal meshes, springs, leaf springs, and webs made of metals such as nickel and stainless steel may be used. In a case of using a material other than silver, silver plating is preferably applied in view of the corrosion resistance.

In a case of disposing the electrode in the electrolytic cell, the ion-exchange membrane, the gas-liquid permeation layer (hydrophilic layer), the gas cathode, and the support are preferably integrated at a pressure of from 0.05 to 30 kgf/cm$^2$. The hydrophilic layer and the gas cathode put between the cathode support and the ion-exchange membrane are fixed by the resiliency of the support and the difference of the water pressure due to the liquid height of the cathode solution. The members may be integrated previously before assembling of the cell and put between the cell gaskets or secured in the support in the same manner as for the ion-exchange membrane.

In a case of using the gas diffusion electrode in sodium hydroxide electrolysis, a fluoro-resin membrane is optimal as the ion-exchange membrane in view of the corrosion resistance. The anode is preferably an insoluble anode made of titanium referred to as DSE, or DSA and the anode is preferably porous so that it can be used in close adhesion with the membrane. In a case where it is necessary that the gas diffusion electrode and the ion-exchange membrane are in close adhesion, it may suffice to mechanically bond them previously or apply a pressure during electrolysis. The pressure is, preferably, from 0.05 to 30 kgf/cm$^2$. As the conditions for electrolysis the temperature is preferably from 60° C. to 95° C. and the current density is, preferably, from 10 to 100 A/cm$^2$.

The oxygen gas is used after optional humidification according to need. For the humidifying method, it can be controlled optionally by disposing a humidifying device heated to 70 to 95° C. at the entrance of the cell and passing the oxygen gas therethrough. In view of the performance of the ion-exchange membrane commercially available at present, it is not necessary for humidification when the concentration of anode water (aqueous sodium hydroxide) is kept at 200 g/liter or less and 150 g/liter or more. Further, humidification is not necessary in the newly developed film. While the concentration of sodium hydroxide is appropriately from 25 to 40%, this is basically determined depending on the characteristics of the film.

In the oxygen gas diffusion electrode of the invention, the electrode substrate comprises at least one carbon material selected from carbon cloth, carbon paper, foamed carbon material, and sintered carbon material.

When the gas diffusion electrode is used being attached to the electrolytic cell, the oxygen gas supplied at the back can be maintained over the entire surface of the electrode catalyst due to the performance of the electrode substrate.

Further, when pressing fabrication is applied to the gas diffusion electrode, the thickness of the gas diffusion electrode is decreased to attain the lowering of the electric resistance. In a case of coating the electrode substrate made of the carbon material with a conductive metal or mixing the conductive metal in the electrode substrate together with the pressing fabrication or separately from the pressing fabrication, the resistance for substrate is lowered. The formed solution of sodium hydroxide formed can be removed along the surface of the hydrophilic conductive metal coating thereby enabling stable operation at a low voltage. Accordingly, the economicity can be improved remarkably compared with that of the existent electrode.

Then, the oxygen gas diffusion electrode of the invention and an embodiment regarding the manufacture thereof are to be described but the invention is not restricted to them.

Figure 2:
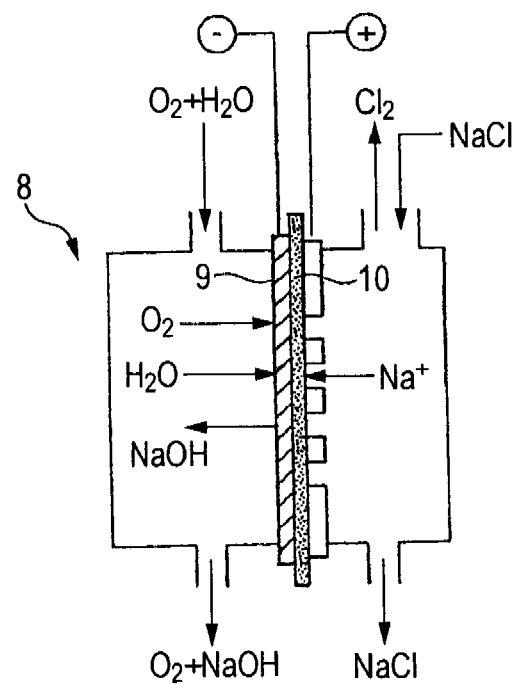
FIG. 2 is a schematic view showing another example of a sodium chloride electrolytic cell using an oxygen gas diffusion cathode.

The oxygen gas diffusion electrode of the invention can be used in the same manner as in any optional existent gas diffusion electrode and, for example, can be used also as the oxygen gas diffusion electrode in the electrolytic cell in FIG. 1 and FIG. 2.

Figure 3:
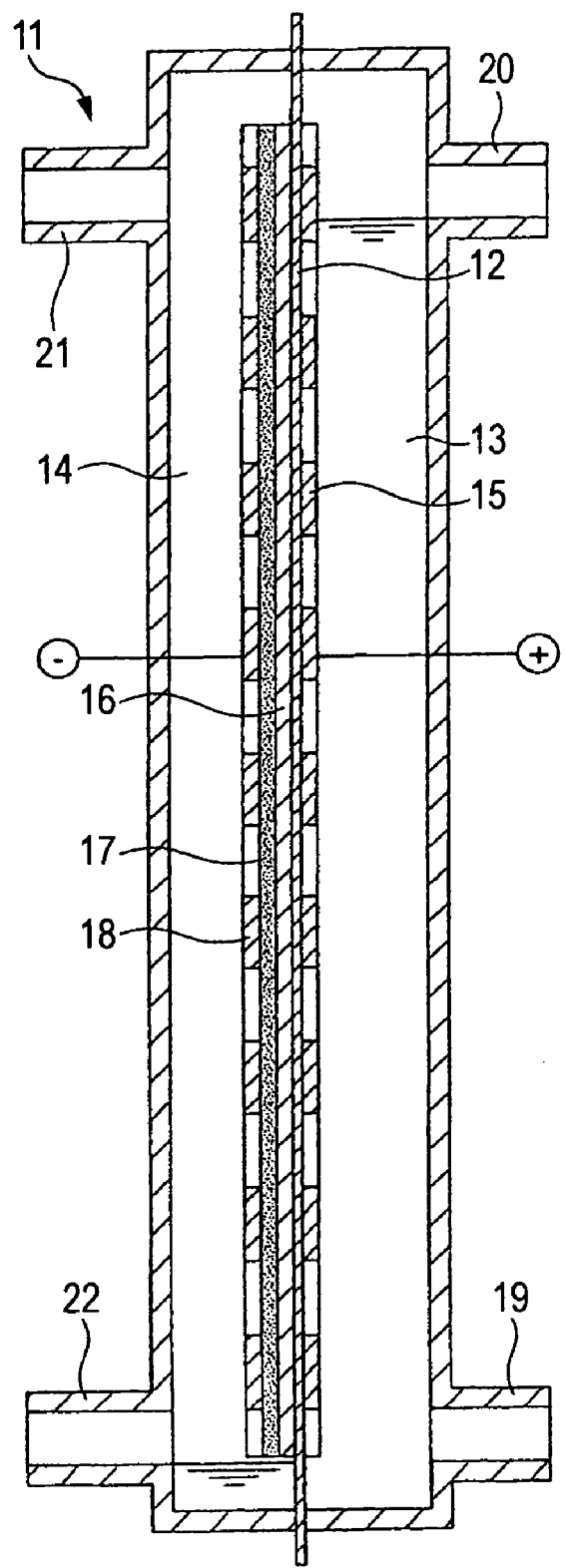
FIG. 3 is a schematic view showing an example of a sodium chloride electrolytic cell using an oxygen gas diffusion cathode according to the invention.

In this case, descriptions are to be made for the oxygen gas diffusion electrode attached to an electrolysis cell in FIG. 3.

A sodium chloride electrolytic cell is partitioned by a cation-exchange membrane 12 into an anode chamber 13 and a cathode chamber 14, in which a mesh-like insoluble anode 15 is in close adhesion with the cation-exchange membrane 12 on the side of the anode chamber, a sheet-like hydrophilic layer 16 is in close adhesion to the ion-exchange membrane 12 on the side of the cathode chamber 14 and, further, a liquid permeable oxygen gas diffusion cathode 17 comprising carbon material such as carbon cloth or carbon paper is in close adhesion with a hydrophilic layer 16, and a mesh-like cathode collector 18 is connected with the oxygen gas diffusion cathode 17 so that current is supplied by the collector 18.

There are shown an inlet port 19 for the anode solution (saturated aqueous solution of sodium chloride) formed on the side wall near the bottom of the anode chamber, a take-out port 20 for the anode solution (unreacted aqueous solution of sodium chloride) and the chlorine gas formed to the side wall near the upper portion of the anode chamber, an oxygen-containing gas inlet port 21 formed on the side wall near the upper portion of the cathode chamber, and a take-out port 22 for sodium hydroxide and excess oxygen formed to the side wall near the bottom of the cathode chamber.

While supplying a saturated aqueous solution of sodium chloride as an anode solution to the anode chamber 13 and supplying an oxygen-containing gas, for example, pure oxygen or air to the cathode chamber 14 of the electrolytic cell 11, when current is supplied between both of the electrodes 15 and 16, sodium hydroxide is formed at the surface of the ion-exchange membrane 12 on the side of the cathode chamber 14. In this case, since the electrode substrate for the oxygen gas diffusion cathode 17 is made of the carbon material, the oxygen-containing gas supplied from the back of the cathode can be maintained over the entire surface of the electrode substrate and the performance of supplying the starting gas to the electrode catalyst is improved, so that the cathode performance is improved.

EXAMPLES

Then, examples regarding the oxygen gas diffusion electrode according to the invention and comparative examples are to be described.

Example 1

A gas diffusion cathode is prepared by mixing a silver powder (AgC—H, manufactured by Fukuda Metal Foil Industry Co.) and an aqueous suspension of PTFE (30J, manufactured by Mitsui Fluoro-Chemical Co.) were mixed at 1:1 volume ratio, coating the mixed liquid suspension on a carbon cloth substrate of 0.4 mm thickness such that it was 600 g/m$^2$ and, after baking in an electric furnace at 330° C. for 15 min, applying press fabrication by a pressing machine at a pressure of 2 kgf/cm$^2$.

A DSE porous anode made of titanium was used for the anode and FLEMION F8020 (manufactured by Asahi Glass Co.) was used as the ion-exchange film respectively. A carbon cloth at 0.4 mm thickness applied with the hydrophilic treatment was used as a hydrophilic layer and a hydrophilic layer was put between the gas diffusion cathode and ion-exchange membrane. The electrolytic cell was constituted by pressing the anode and the gas diffusion cathode in the direction of the ion-exchange membrane respectively and adhering and fixing each of the members such that the ion-exchange membrane was positioned in the vertical direction.

The concentration of sodium chloride in the anode chamber was controlled such that the concentration of sodium hydroxide was 32% in the cathode chamber. When electrolysis was conducted while supplying an oxygen gas to the cathode about at a rate twice the theoretical amount and maintaining the liquid temperature for the cathode solution to 90° C. and the current density at 60 A/cm$^2$, the cell voltage was 2.16 V and sodium hydroxide at 32% was obtained from the exit of the cathode chamber at a current efficiency of about 95%.

Figure 4:
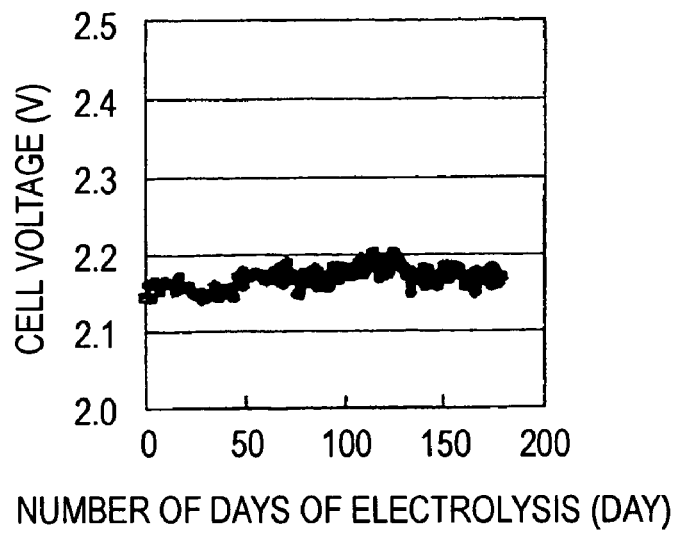
FIG. 4 is a graph showing a relation between the number of days of electrolysis and the cell voltage in Example 1.
Figure 5:
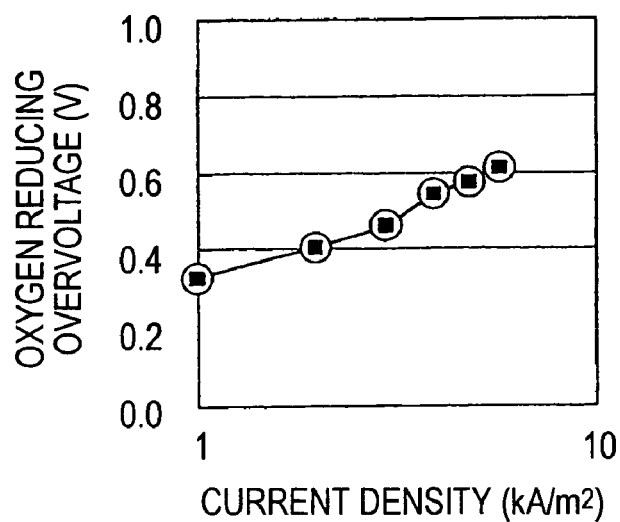
FIG. 5 is a graph showing a relation between the current density and the oxygen reducing overvoltage in Example 1.

When electrolysis was continued for 170 days, the cell voltage was kept substantially constant within a range from 2.15 to 2.20 V as shown in FIG. 4. After starting electrolysis, after 9 days, and after 150 days, when the oxygen reducing overvoltage at each of the current densities varied as 1 kA/m$^2$, 2 kA/m$^2$, 3 kA/m$^2$, 4 kA/m$^2$, 5 kA/m$^2$, and 6 kA/m$^2$, it was 0.32 V, 0.40 V, 0.45 V, 0.55 V, 0.58 V, and 0.62 V orderly, the values after 9 days and 150 days correspond each other, and the overvoltage was kept constant. The results are shown in the graph (logarithmic graduation) in FIG. 5. The current efficiency was maintained at about 95%.

Example 2

A gas diffusion cathode was prepared under the same conditions as those in Example 1 except for not conducting the pressing fabrication, and electrolysis was conducted under the same conditions. The initial cell voltage showed 2.18 V, which was increased by 20 mV after electrolysis for 100 days.

Example 3

A gas diffusion cathode was prepared under the same conditions as those in Example 1 except for conducting the pressing fabrication at a pressure of 20 kgf/cm$^2$. The initial cell voltage was 2.13 V.

Reference Example

A gas diffusion cathode was prepared under the same conditions as those in Example 1 except for conducting the pressing fabrication at a pressure of 80 kgf/cm. While the initial cell voltage was 2.22 V, when the electrode was observed, the carbon cloth was disconnected and the mechanical strength was lowered.

Example 4

A gas diffusion cathode was prepared under the same conditions as those in Example 1 except for changing the electrode substrate from the carbon cloth to carbon paper (P50T manufactured by Ballard Material Products Co.) and electrolysis was conducted under the same conditions. The initial cell voltage was 2.20 V.

Example 5

The carbon cloth substrate of Example 1 was dipped in an aqueous solution containing 5 g/liter of silver thiocyanate and 20 g/liter of potassium thiocyanate and current was supplied at a current density of 1 A/dm$^2$ at a room temperature while stirring properly to electrodeposit silver by 30 g/m$^2$ to the surface of the electrode substrate.

After sufficient washing, a gas diffusion cathode was prepared under the same conditions as those in Example 1 and electrolysis was evaluated under the same conditions. The initial cell voltage was 2.12 V.

Example 6

A carbon cloth in which silver wires of 0.2 mm diameter were woven was prepared. The weight of silver in the electrode substrate was 20 g/m$^2$ and the weight ratio to carbon was about 20% (4% by solid volume). Electrolysis was conducted in the same manner as in Example 1. The initial voltage was 2.15V.

Comparative Example 1

A gas diffusion electrode was prepared under the same conditions as those in Example 1 except for changing the electrode substrate from the carbon cloth to foamed nickel material and electrolysis was conducted under the same conditions. The initial cell voltage was as high as 2.35 V.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2005-31774 filed on Feb. 8, 2005, and the contents thereof are incorporated herein by reference.

What is claimed is:

1. A gas diffusion electrode comprising:
   an electrode substrate; and
   a catalyst layer containing a hydrophilic catalyst and a hydrophobic binder, which is carried on the electrode substrate,
   wherein the electrode substrate is formed of woven carbon fabric, and
   wherein the electrode substrate is further coated with a conductive metal, or a fiber or a particle of the conductive metal is mixed in the electrode substrate in an amount of 1 to 50% by volume of the substrate.

2. The gas diffusion electrode according to claim 1, wherein the hydrophilic catalyst or the conductive metal is a silver or a silver alloy.

* * * * *